US012073055B2

(12) United States Patent
Zhang

(10) Patent No.: US 12,073,055 B2
(45) Date of Patent: Aug. 27, 2024

(54) ICON DISPLAY METHOD AND MOBILE TERMINAL

(71) Applicant: VIVO MOBILE COMMUNICATION CO., LTD., Guangdong (CN)

(72) Inventor: Guoji Zhang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 17/588,684

(22) Filed: Jan. 31, 2022

(65) Prior Publication Data

US 2022/0155939 A1 May 19, 2022

Related U.S. Application Data

(63) Continuation of application No. PCT/CN2020/099971, filed on Jul. 2, 2020.

(30) Foreign Application Priority Data

Aug. 1, 2019 (CN) .......................... 201910706331.X

(51) Int. Cl.
*G06F 3/04817* (2022.01)
*G06F 3/14* (2006.01)
*H04M 1/72454* (2021.01)

(52) U.S. Cl.
CPC ........ *G06F 3/04817* (2013.01); *G06F 3/1446* (2013.01); *H04M 1/72454* (2021.01)

(58) Field of Classification Search
CPC .............. G06F 3/04817; G06F 3/1446; H04M 1/72454
See application file for complete search history.

(56) References Cited

U.S. PATENT DOCUMENTS

2012/0164971 A1\* 6/2012 Choi ....................... G06F 9/445
455/405
2013/0162503 A1\* 6/2013 Chen ..................... G06F 1/1616
345/1.3

(Continued)

FOREIGN PATENT DOCUMENTS

CN 104461281 A 3/2015
CN 105528167 A 4/2016

(Continued)

OTHER PUBLICATIONS

International Search Report and Written Opinion of International Application No. PCT/CN2020/099971 issued by the Chinese Patent Office on Oct. 10, 2020.

(Continued)

*Primary Examiner* — Sherrod L Keaton
(74) *Attorney, Agent, or Firm* — IP & T GROUP LLP

(57) ABSTRACT

An icon display method includes: obtaining a current use scenario of the mobile terminal; determining a primary icon and a subordinate icon in desktop icons of the mobile terminal based on the current use scenario of the mobile terminal; and displaying the primary icon on a first screen. The first screen is a screen that currently faces a user in the two screens, the subordinate icon is used to be displayed on a second screen, and the second screen is a screen that is currently backwards the user in the two screens.

15 Claims, 9 Drawing Sheets

(56) References Cited

U.S. PATENT DOCUMENTS

| | | | |
|---|---|---|---|
| 2014/0068516 A1* | 3/2014 | Escobedo | G06F 3/0482 |
| | | | 715/835 |
| 2014/0240342 A1 | 8/2014 | Xu et al. | |
| 2016/0183047 A1 | 6/2016 | Jouin | |
| 2017/0115944 A1 | 4/2017 | Oh et al. | |
| 2019/0014451 A1* | 1/2019 | Moon | H04M 1/72403 |

FOREIGN PATENT DOCUMENTS

| | | |
|---|---|---|
| CN | 106231087 A | 12/2016 |
| CN | 106412255 A | 2/2017 |
| CN | 106484392 A | 3/2017 |
| CN | 106775230 A | 5/2017 |
| CN | 108958865 A | 12/2018 |
| CN | 109144441 A | 1/2019 |
| CN | 109189282 A | 1/2019 |
| CN | 109460655 A | 3/2019 |
| CN | 109542551 A | 3/2019 |
| CN | 109683764 A | 4/2019 |
| CN | 110007882 A | 7/2019 |
| CN | 110427165 A | 11/2019 |
| EP | 2996030 A1 | 3/2016 |
| JP | 2001-326881 A | 11/2001 |
| KR | 10-2016-0020735 A | 2/2016 |

OTHER PUBLICATIONS

First Office Action of priority application No. CN 201910706331.X issued by the Chinese Patent Office on Nov. 12, 2020.

Extended European Search Report on the European Patent Application No. 20846573.2 issued by the European Patent Office on Aug. 19, 2022, Jan. 24, 2024.

* cited by examiner

ICON DISPLAY METHOD AND MOBILE TERMINAL

CROSS-REFERENCE TO APPLICATIONS

This application is a Bypass Continuation Application of PCT/CN2020/099971 filed on Jul. 2, 2020, which claims priority to Chinese Patent Application No. 201910706331.X filed on Aug. 1, 2019, which are incorporated herein by reference in their entirety.

TECHNICAL FIELD

The present disclosure relates to the field of communication technologies, and in particular, to an icon display method and a mobile terminal.

BACKGROUND

With continuous development and progress of information technologies, mobile terminals such as mobile phones are rapidly updated. In addition, as storage space of the mobile terminal increases and application programs are continuously developed, increasingly more application programs are installed on the mobile terminal. How to manage desktop icons to help a user quickly find an application becomes an important research direction that needs to be discussed currently.

SUMMARY

According to a first aspect, an embodiment of the present disclosure provides an icon display method, performed by a mobile terminal, where the mobile terminal includes two screens, the two screens are respectively located on two surfaces of the mobile terminal that are disposed opposite to each other, and the method includes:
obtaining a current use scenario of the mobile terminal;
determining a primary icon and a subordinate icon in desktop icons of the mobile terminal based on the current use scenario of the mobile terminal, where the primary icon is related to the current use scenario of the mobile terminal; and
displaying the primary icon on a first screen, where the first screen is a screen that currently faces a user in the two screens, the subordinate icon is used to be displayed on a second screen, and the second screen is a screen that is currently backwards the user in the two screens.

According to a second aspect, an embodiment of the present disclosure provides a mobile terminal, including two screens, where the two screens are respectively located on two surfaces of the mobile terminal that are disposed opposite to each other, and the mobile terminal further includes:
an obtaining module, configured to obtain a current use scenario of the mobile terminal;
a determining module, configured to determine a primary icon and a subordinate icon in desktop icons of the mobile terminal based on the current use scenario of the mobile terminal, where the primary icon is related to the current use scenario of the mobile terminal; and
a display module, configured to display the primary icon on a first screen, where the first screen is a screen that currently faces a user in the two screens, the subordinate icon is used to be displayed on a second screen, and the second screen is a screen that is currently backwards the user in the two screens.

According to a third aspect, an embodiment of the present disclosure provides a mobile terminal, including a processor, a memory, and a computer program that is stored in the memory and executable on the processor, and when the computer program is executed by the processor, steps of the foregoing icon display method are implemented.

According to a fourth aspect, an embodiment of the present disclosure further provides a non-transitory computer-readable storage medium, where the non-transitory computer-readable storage medium stores a computer program, and when the computer program is executed by a processor, steps of the foregoing icon display method are implemented.

BRIEF DESCRIPTION OF DRAWINGS

To describe the technical solutions of the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other accompanying drawings from these accompanying drawings.

DESCRIPTION OF EMBODIMENTS

The following clearly describes the technical solutions in the embodiments of the present disclosure with reference to the accompanying drawings in the embodiments of the present disclosure. Apparently, the described embodiments are some rather than all of the embodiments of the present disclosure. Based on the embodiments of the present disclosure, all other embodiments obtained by a person of ordinary skill in the art shall fall within the protection scope of the present disclosure.

Generally, application icons of all application programs installed on a desktop of a mobile terminal are displayed on the desktop, and the application icons may be classified and managed automatically or according to a manual operation performed by a user, and application icons of similar functions or a same type are stored in a same application folder, to save desktop space and facilitate searching by the user. In addition, the user may further start a corresponding application program by using a desktop search function by entering a name of an application program expected to be found. However, this manner is inconvenient for the user to operate.

However, as increasingly more application programs are installed on the mobile terminal, a quantity of desktop icons increases accordingly, and it is difficult for the user to memorize a position of each application icon. Consequently, the user often needs to spend a relatively long time in finding a desired application icon. In the desktop searching manner, a name of the application icon needs to be manually entered by the user, which also causes inconvenient operations of the user and relatively low searching efficiency.

Figure 1:
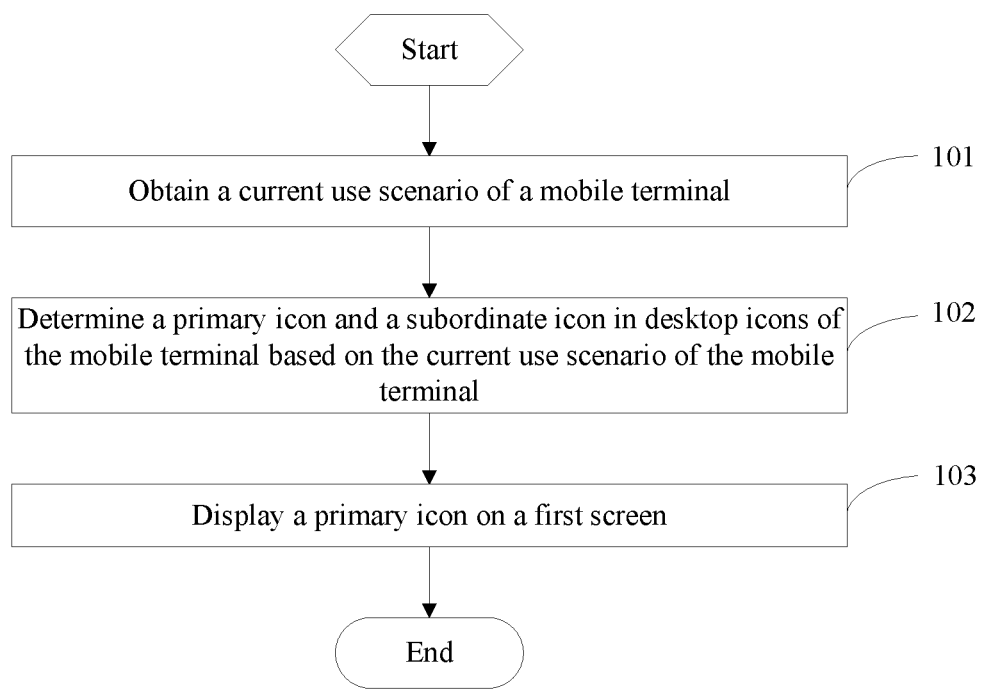
FIG. 1 is a flowchart of an icon display method according to an embodiment of the present disclosure.

FIG. 1 is a flowchart of an icon display method according to an embodiment of the present disclosure, and the icon display method is performed by a mobile terminal. The mobile terminal includes two screens, and the two screens are respectively located on two surfaces of the mobile terminal that are disposed opposite to each other. As shown in FIG. 1, the method includes the following steps.

Step 101: Obtain a current use scenario of the mobile terminal.

In this embodiment of the present disclosure, the foregoing current use scenario of the mobile terminal may be determined based on a time period in which the mobile terminal is currently located or a position scenario in which the mobile terminal is currently located, or may be determined with reference to a time period in which the mobile terminal is currently located and a position scenario in which the mobile terminal is currently located, or may be more accurately determined based on another factor (for example, detected user behavior data).

The use scenario may include at least one of the current time period or the current position scenario.

Therefore, in this step, the foregoing obtaining a current use scenario of the mobile terminal may be: obtaining at least one of the time period in which the mobile terminal is currently located or the position scenario in which the mobile terminal is currently located, or obtaining other scenario data currently associated with the mobile terminal, such as environment data or user behavior data.

The position scenario may include a company scenario, a home scenario, a shopping mall scenario, a scenic area scenario, or a position scenario marked by a user, and may be determined based on geographical position information of the mobile terminal. The current time period may include morning, afternoon, evening, a user-defined time period, or the like, and may be determined based on time of a region in which the mobile terminal is located.

Step 102: Determine a primary icon and a subordinate icon in desktop icons of the mobile terminal based on the current use scenario of the mobile terminal, where the primary icon is related to the current use scenario of the mobile terminal.

In this embodiment of the present disclosure, an icon attribute in the desktop icons of the mobile terminal may be determined based on the current use scenario of the mobile terminal, for example, a primary icon and a subordinate icon. For example, an icon that is on a desktop of the mobile terminal and that is related to the current use scenario of the mobile terminal is determined as the primary icon, and an icon that is on the desktop and that is associated with the primary icon may be determined as the subordinate icon, or an icon that is on the desktop and that is unrelated to the current use scenario of the mobile terminal is determined as the subordinate icon.

In this step, there may be one or more primary icons and one or more subordinate icons. After the current use scenario of the mobile terminal is obtained, it may be determined whether each desktop icon is related to the current use scenario of the mobile terminal. If a desktop icon is related to the current use scenario of the mobile terminal, it may be determined that the desktop icon is the primary icon; otherwise, it may be determined that the icon is the subordinate icon.

Being related to the current use scenario of the mobile terminal may be that there is a relatively high probability that an application program corresponding to an icon is started by the user in the current use scenario of the mobile terminal, or may be that an application category to which an application program corresponding to an icon belongs matches the current use scenario of the mobile terminal to a relatively large extent, or may be that an application corresponding to an icon is a primary icon in the current use scenario of the mobile terminal that is set by the user.

For example, when the mobile terminal is in a shopping mall scenario, the user is generally accustomed to starting a shopping application program to view prices of some commodities. Therefore, a probability that a desktop icon of the shopping application program is started in the shopping mall scenario is relatively high. Therefore, in this case, the desktop icon of the shopping application program is a primary icon. An office application program matches a company scenario to a relatively large extent. When the mobile terminal is in the company scenario, a desktop icon of the office application program is a primary icon. The user presets that a desktop icon of a game application program is a primary icon in an off-duty period in the evening (for example, a period from 19:00 to 23:00), so that when the mobile terminal is in the off-duty period in the evening, the desktop icon of the game application program is a primary icon.

After determining the primary icon in the desktop icons of the mobile terminal, another desktop icon that is not the primary icon is a subordinate icon, or a subordinate icon associated with each primary icon is determined based on a preset association relationship between the desktop icons.

It should be noted that, to quickly determine whether each desktop icon on the mobile terminal is a primary icon or a subordinate icon in different use scenarios, the user may preset an attribute (that is, a primary icon or a subordinate icon) of each desktop icon in a specific use scenario, or this may not need to be preset by the user, and the mobile terminal actively determines an attribute of each desktop icon in the current use scenario according to a preset attribute setting rule. The preset attribute setting rule may be that the attribute of the desktop icon is set based on an association relationship between the use scenario and each desktop icon.

Step 103: Display the primary icon on a first screen, where the first screen is a screen that currently faces a user in the two screens, the subordinate icon is used to be displayed on a second screen, and the second screen is a screen that is currently backwards the user in the two screens.

In this embodiment, after the primary icon and the subordinate icon in the desktop icons of the mobile terminal are determined, the primary icon may be displayed on the first screen. For example, the primary icon is displayed on a desktop home page of the first screen, so that the user quickly finds, from the desktop home page after unlocking the screen, an application icon of an application program that needs to be used in the current use scenario, where the first screen is a screen that currently faces the user in the two screens, so that the user quickly operates an application program corresponding to the primary icon.

It should be further noted that, to save screen display space or desktop display space, only the primary icon may be displayed on the first screen, and the subordinate icon is not displayed on the first screen, that is, only the desktop icon related to the current use scenario of the mobile terminal is displayed on the first screen, and another desktop icon unrelated to the current use scenario of the mobile terminal is hidden on the first screen.

For the determined subordinate icon, it may be set that a display position of the subordinate icon in the current use scenario is the second screen, that is, a screen that is currently backwards the user in the two screens. When the user faces the first screen, the subordinate icon may not be displayed by default, that is, the second screen may be in an off state. When the user rotates the mobile terminal and flips the screen, the subordinate icon may be displayed on the second screen.

For example, when the mobile terminal is in a lunch time period, a take-out application icon related to the lunch time period on the desktop of the mobile terminal may be displayed on the first screen (that is, a front screen). After the lunch time period, the mobile terminal may set, to the second screen (that is, a back screen), a default display position of the take-out application icon that is no longer related to the current use scenario of the mobile terminal.

For another example, when the mobile terminal is in a shopping mall scenario, a shopping application icon associated with the shopping mall scenario on the desktop of the mobile terminal may be displayed on the first screen (that is, a front screen). After the mobile terminal leaves the shopping mall scenario, a default display position of the shopping application icon that is no longer related to the current use scenario of the mobile terminal may be set to the second screen (that is, a back screen).

In this way, in the current use scenario of the mobile terminal, the user may quickly find, on the first screen, an application icon of an application program that needs to be started and that is related to the current use scenario of the mobile terminal, and perform well classification and management on the desktop icons of the mobile terminal, so that screen display space of the mobile terminal is saved, and efficiency of finding the application icon by the user is also improved.

It should be noted that, for each desktop icon on the mobile terminal, the user may set attributes of the desktop icon in different use scenarios. For example, an attribute setting item may be added on a system setting page. After entering the attribute setting page, the user may separately set in which use scenario an application corresponding to each desktop icon is a subordinate application attribute.

Figure 2A:
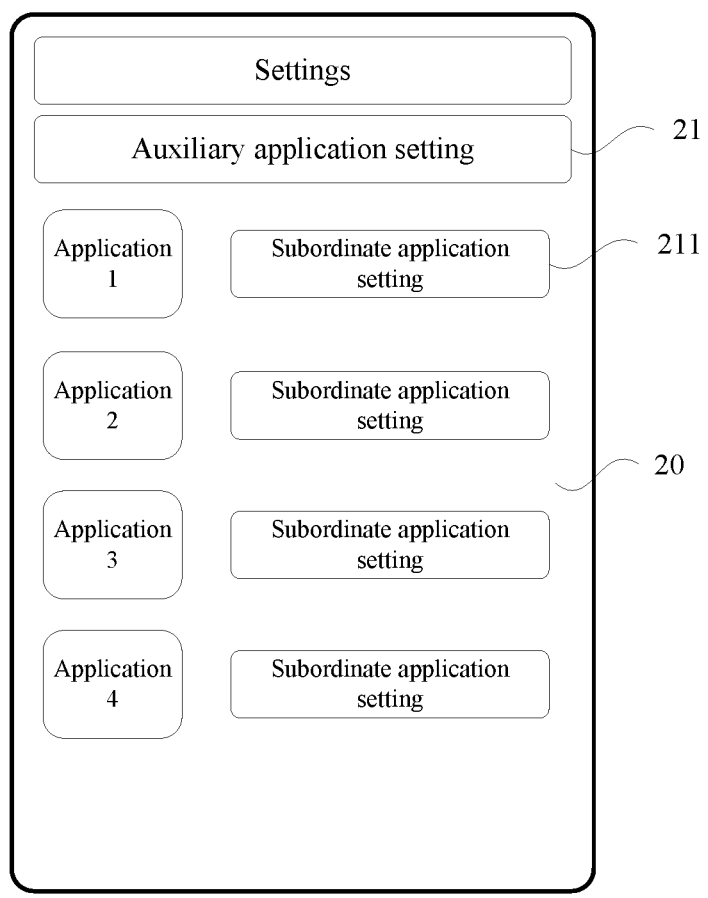
FIG. 2A is a schematic interface diagram of a setting page that includes an auxiliary application setting item according to an embodiment of the present disclosure.
Figure 2B:
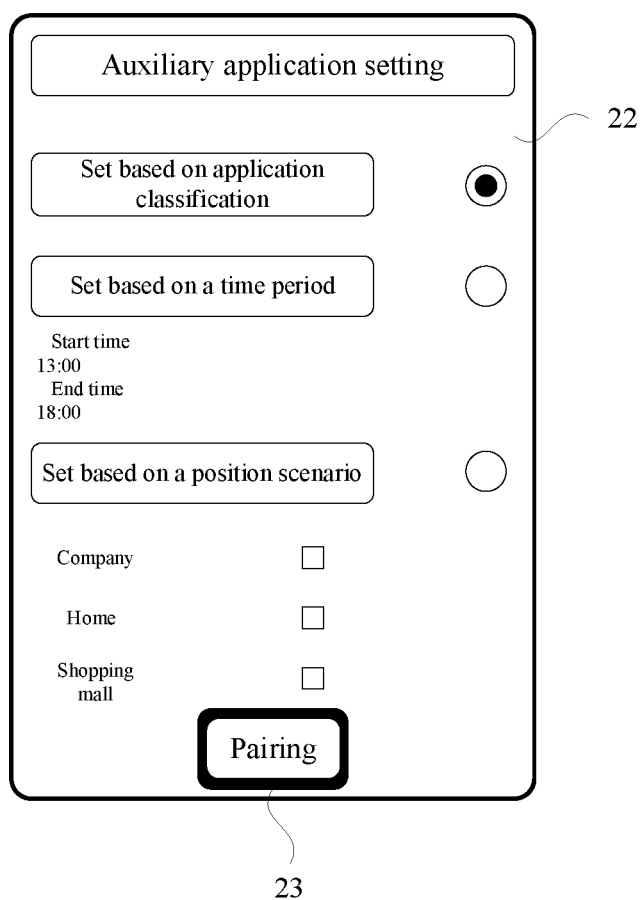
FIG. 2B is a schematic interface diagram of an auxiliary application setting page according to an embodiment of the present disclosure.

For example, referring to FIG. 2A and FIG. 2B, FIG. 2A is a schematic diagram of an interface of a setting page including a subordinate application setting item (that is, the foregoing attribute setting item). By setting the subordinate application setting item 21 on the page 20, the user may set an attribute of each application program installed on the mobile terminal. For example, a subordinate application attribute effective scenario of each application program may be set.

When an operation that the user touches a subordinate application setting control 211 corresponding to an application program in the subordinate application setting item 21 is received, as shown in FIG. 2B, the mobile terminal jumps from the setting page 20 to a subordinate application setting page 22 of the application program, and the subordinate application setting page 22 may provide three optional setting manners, which are respectively set based on application categories, set based on a time period, and set based on a position scenario. Being set based on application categories means setting, based on categories of the application programs, an attribute of an application program in a category to which a currently set application program belongs. The attribute setting may be in a default checked state, and the user may set whether to uncheck. If the user unchecks, only an attribute of a current application program is set.

In addition, as shown in FIG. 2B, the user may choose to perform setting based on a time period or based on a position scenario. If the user chooses to perform setting based on a time period, an effective start time and an effective end time of a subordinate application attribute may be set to obtain an effective time period of the subordinate application attribute. If the user chooses to perform setting the position scenario, a position scenario in which the subordinate application attribute takes effect may be set, for example, one or more of a company scenario, a home scenario, and a shopping mall scenario are checked.

In this way, the user may flexibly set a subordinate application attribute effective scenario of each application program based on a requirement of the user by using a subordinate application setting item on the setting page, so that an application icon of an application program related to the current use scenario is separately displayed when the mobile terminal is in different use scenarios of the mobile terminal, and the user can quickly find an application icon of a required application program.

In this embodiment of the present disclosure, the mobile terminal may be any device that has a storage medium, for example: a computer, a mobile phone, a tablet personal computer, a laptop computer, a personal digital assistant (PDA), or a mobile internet device (MID), a wearable device.

In the icon display method in this embodiment, an application icon of an application program related to a current use scenario is displayed on a screen of a mobile terminal, to save screen display space of the mobile terminal. In this way, a relatively small quantity of application icons are displayed on the screen of the mobile terminal, and the displayed application icon is relatively related to the current use scenario, so that a user can quickly find an application icon of a desired application program, thereby improving icon searching efficiency.

Figure 3:
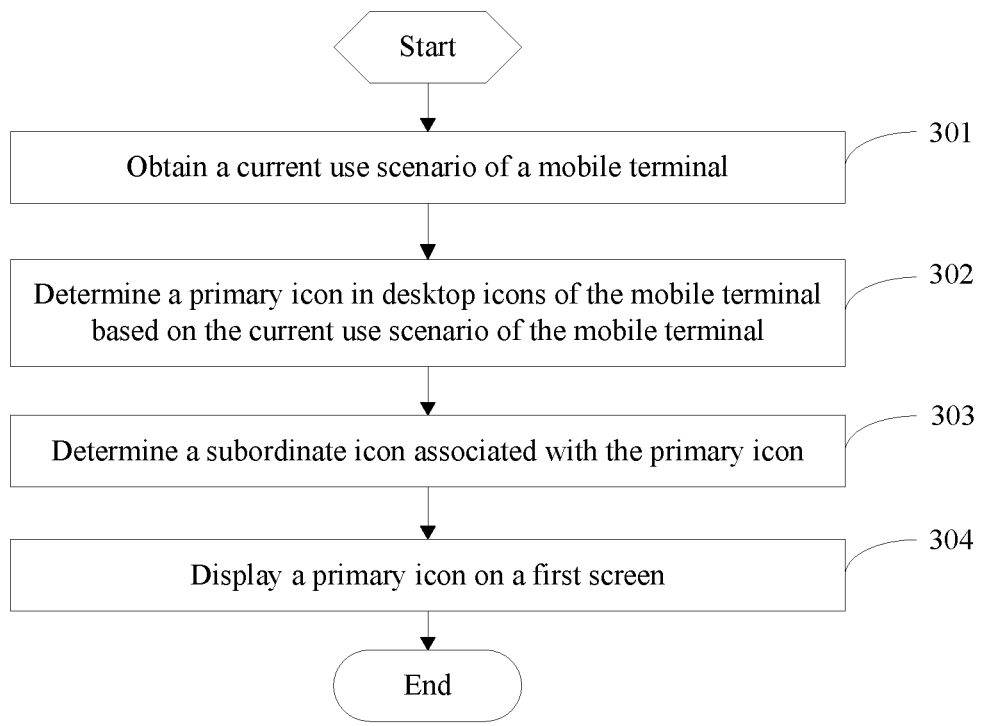
FIG. 3 is a flowchart of another icon display method according to an embodiment of the present disclosure.

FIG. 3 is a flowchart of another icon display method according to an embodiment of the present disclosure, and the icon display method is performed by a mobile terminal. Based on the embodiment shown in FIG. 1, the step of determining a primary icon and a subordinate icon in desktop icons of the mobile terminal based on the current use scenario of the mobile terminal is further detailed, and a display position of the subordinate icon is limited, so that a determining manner and the display position of the subordinate icon are clearer and more specific, and it is convenient for a user to memorize a display position of each subordinate icon. As shown in FIG. 3, the method includes the following steps.

Step 301: Obtain a current use scenario of the mobile terminal.

For a specific implementation of this step, refer to the implementation of step 101 in the method embodiment shown in FIG. 1. To avoid repetition, details are not described herein again.

Step 302: Determine a primary icon in desktop icons of the mobile terminal based on the current use scenario of the mobile terminal, where the primary icon is related to the current use scenario of the mobile terminal.

For a specific implementation of this step, refer to the implementation of step 102 in the method embodiment shown in FIG. 1. To avoid repetition, details are not described herein again.

Step 303: Determine a subordinate icon associated with the primary icon.

In this embodiment, to help a user memorize a position of each desktop icon, different desktop icons may be paired based on a degree of relation between each desktop icon and the current use scenario of the mobile terminal, which may be specifically determined according to a pairing rule preset by the user. For example, the user presets that an application icon A is paired with an application icon B, and when it is determined that the application icon A is a primary icon, the application icon B may be determined as a subordinate icon associated with the application icon A.

Figure 2C:
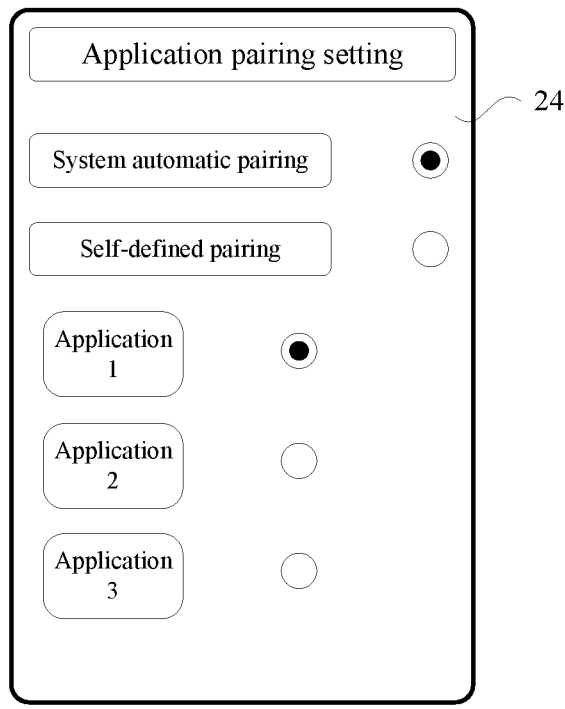
FIG. 2C is a schematic interface diagram of an application pairing and setting page according to an embodiment of the present disclosure.

For example, referring to FIG. 2B, a pairing control 23 may be displayed on a bottom end of a subordinate application setting page 22 of an application program. When the user touches the pairing control 23, as shown in FIG. 2C, the mobile terminal may jump to an application pairing setting page 24, and two pairing manners may be provided on the application pairing setting page 24, that is, a system automatic pairing manner and a user-defined pairing manner. The user may choose to use the system automatic pairing manner or the user-defined pairing manner. If the user selects the user-defined pairing manner, the user may specify an expected application icon in an application program list displayed in a lower part as a to-be-paired application icon.

The determining a subordinate icon associated with the primary icon may alternatively be: the mobile terminal automatically pairs a subordinate icon of each primary icon based on the current use scenario, for example, first determining a desktop icon list that is in the desktop icons of the mobile terminal and that is unrelated to the current use scenario of the mobile terminal, and then selecting, from the desktop icon list, a desktop icon that meets a specific condition as the subordinate icon of the primary icon, where the specific condition may be that relation to the primary icon is relatively low or a probability or duration of being a same attribute (both are primary icons or subordinate icons) is relatively small.

It should be noted that if the user presets a pairing rule of the desktop icons, when attributes of two desktop icons specified to be paired are different in a specific use scenario, a primary icon and a subordinate icon may be displayed on the first screen and the second screen respectively; and when attributes of two desktop icons to be paired are the same in another use scenario, both the two desktop icons may be independently displayed on the first screen as primary icons, or may be independently displayed on the second screen as subordinate icons. For example, the user presets that a desktop icon A is to be paired with a desktop icon B. When both the desktop icon A and the desktop icon B are primary icons in a specific use scenario, the desktop icon A and the desktop icon B may be independently displayed on the first screen, or when both the desktop icon A and the desktop icon B are subordinate icons in specific a use scenario, the desktop icon A and the desktop icon B may be independently displayed on the second screen.

Optionally, the determining a subordinate icon associated with the primary icon includes:

determining, based on a preset icon association relationship, the subordinate icon associated with the primary icon; or determining an icon in the desktop icons of the mobile terminal that has a minimum conflict value with the primary icon as the subordinate icon associated with the primary icon, where a minimum conflict value indicates a shortest duration that two icons are simultaneously are primary icons or subordinate icons in the current use scenario of the mobile terminal.

In an implementation, an association relationship between the desktop icons may be preset, so that desktop icons that are in an association relationship may be a primary icon and a subordinate icon for each other. Therefore, after the primary icon in the desktop icons is determined based on the current use scenario of the mobile terminal, a subordinate icon associated with each primary icon may be quickly determined based on the preset icon association relationship. For example, it is preset that the desktop icon A is associated with the desktop icon B. When it is determined that the desktop icon A is a primary icon, it may be determined that the desktop icon B is a subordinate icon of the desktop icon A.

In another implementation, the mobile terminal may automatically match, based on the current use scenario, the subordinate icon associated with the primary icon. For example, to-be-paired desktop icons that are in the desktop icons of the mobile terminal and that are unrelated to the current use scenario of the mobile terminal may be determined first, and then a conflict value between each desktop icon in the to-be-paired desktop icons and a target primary icon is separately calculated, and finally, an icon that is in the to-be-paired desktop icons and that has a minimum conflict value with the target primary icon (that is, shortest duration in which the icon has a same attribute as the target primary icon in the current use scenario of the mobile terminal) is determined as a subordinate icon of the target primary icon.

That a conflict value between each desktop icon in the to-be-paired desktop icons and a target primary icon is separately calculated may be: separately calculating duration in which each desktop icon in the to-be-paired desktop icons and the target primary icon are both primary icons or subordinate icons in the current use scenario of the mobile terminal. For example, a time period, a position scenario, and the like in which each desktop icon in the to-be-paired desktop icons is a primary icon is counted, and the duration in which each desktop icon and the target primary icon are a same attribute is obtained with reference to the time period, the position scenario, and the like in which each desktop icon in the to-be-paired desktop icons is a primary icon and a time period, a position scenario, and the like in which the target primary icon is a primary icon attribute.

For example, a desktop icon A is a primary icon attribute in a time period from 8:00 a.m. to 10:00 a.m., a desktop icon B is a subordinate icon attribute in a time period from 8:00 a.m. to 9:30 a.m., and a desktop icon C is a subordinate icon attribute in a time period from 9:00 a.m. to 10:00 a.m. In this way, because duration in which the desktop icon B conflicts with the desktop icon A is only half an hour, and duration in which the desktop icon C conflicts with the desktop icon A is one hour, it may be determined that a value of a conflict between the desktop icon B and the desktop icon A is the smallest, and further, it may be determined that the desktop icon B of the mobile terminal is a subordinate icon of the desktop icon A in the time period from 8:00 a.m. to 9:30 a.m.

In this way, a value of a conflict between each desktop icon in the to-be-paired desktop icons and the primary icon is separately calculated, so that the subordinate icon associated with the primary icon is determined based on the calculated conflict value, and a purpose of determining the subordinate icon of the primary icon in real time and flexibly can be achieved, and the user does not need to preset to-be-paired desktop icons, thereby further reducing user operations.

Step 304: Display the primary icon on the first screen.

The first screen is a screen that currently faces the user in the two screens, the subordinate icon associated with the primary icon is used to be displayed at a target position on the second screen, the second screen is a screen that is currently backwards the user in the two screens, and the target position is opposite to a display position of the primary icon on the first screen.

After the subordinate icon associated with the primary icon is determined, the primary icon may be displayed on the first screen, and a target position on the second screen at which the subordinate icon of the primary icon is displayed is determined. The target position is a position on the second screen that is opposite to the display position of the primary icon on the first screen, that is, the display position of the primary icon and the display position of the subordinate icon may respectively correspond to positions with same coordinates on the first screen and the second screen, that is, the display position of the primary icon on the first screen and the display position of the subordinate icon on the second screen are mirrored display positions.

In this way, because the primary icon and the subordinate icon of the primary icon may be separately displayed at opposite positions of the first screen and the second screen, the user may conveniently find, by using display positions of the desktop icons displayed on the first screen, a corresponding subordinate icon displayed on the second screen, thereby releasing pressure of the user for memorizing a display position of each application icon.

Optionally, step 304 includes:
displaying the primary icon on the first screen, and displaying, on the primary icon, an application subscript used to indicate the subordinate icon associated with the primary icon.

To more intuitively notify the user of to-be-paired icons in desktop icons, on each primary icon displayed on the first screen, an application subscript that is used to indicate a subordinate icon associated with the primary icon may be separately displayed, where the application subscript may be a thumbnail of an application icon of a corresponding application program or a simple flag of a corresponding application program.

Therefore, in this implementation, after the subordinate icon associated with the primary icon is determined, the primary icon may be displayed on the first screen, and an application subscript used to indicate the subordinate icon associated with the primary icon is displayed on the primary icon. Similarly, when the second screen is in a screen-on state, the subordinate icon of the primary icon may be displayed at a target position of the second screen, and an application subscript used to indicate the primary icon is displayed on the subordinate icon of the primary icon. A display position of the application subscript may be an upper left corner, a lower left corner, a lower right corner, or the like of the application icon.

Figure 4A:
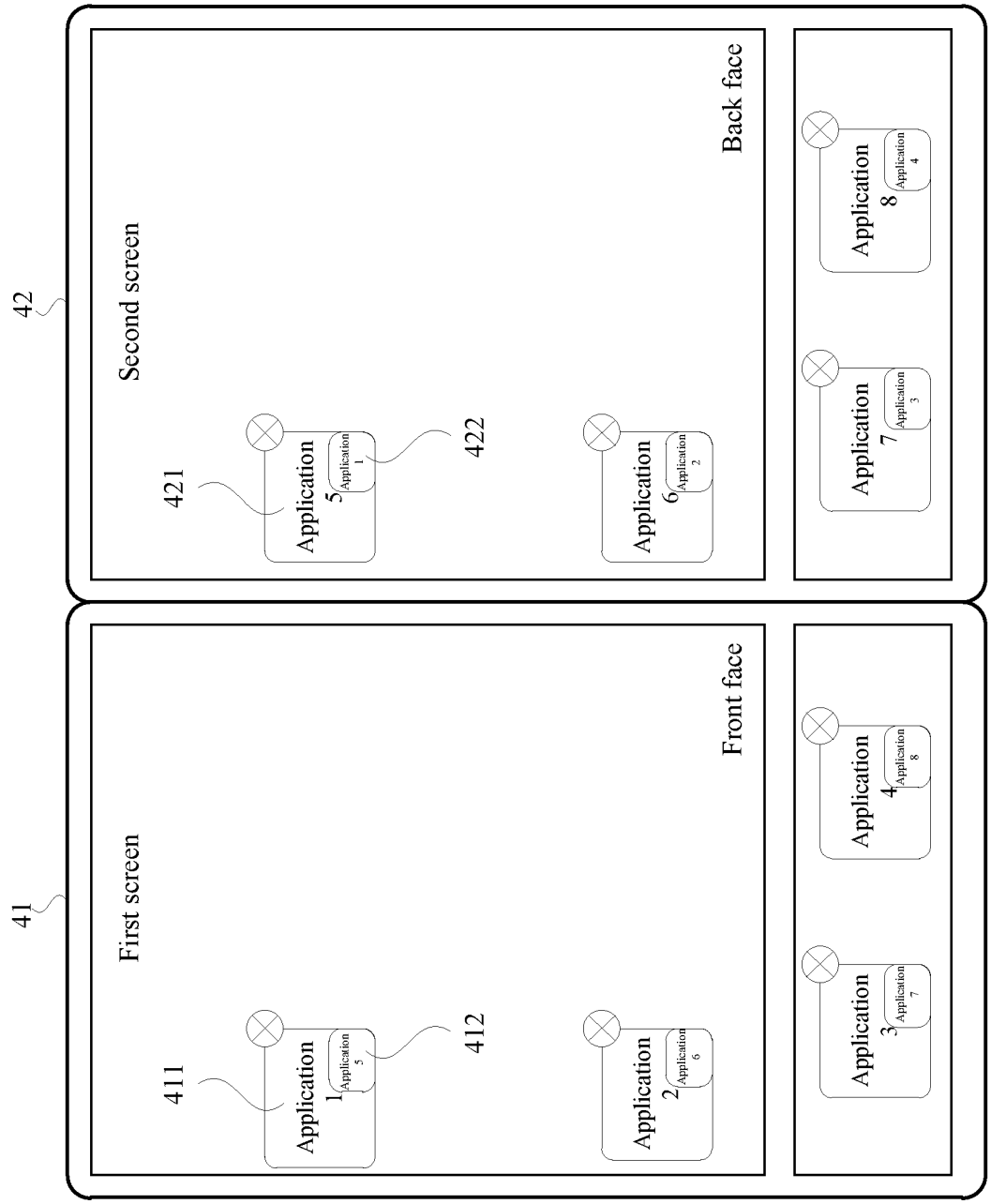
FIG. 4A is a schematic diagram of an interface in which a corresponding application icon and a corresponding application subscript are respectively displayed on a front screen and a back screen according to an embodiment of the present disclosure.

For example, as shown in FIG. 4A, an application icon 411, that is, a primary icon, of an application program commonly used in a current use scenario is displayed on the first screen 41 (the front screen) of the mobile terminal, and an application subscript 412 of a corresponding subordinate icon is displayed in a lower right corner of each application icon 411. When the second screen 42 (the back screen) of the mobile terminal is displayed, an application icon 421, that is, a subordinate icon, of an application program that is not commonly used in the current use scenario is displayed on the second screen 42 of the mobile terminal, and a corresponding application subscript 422 is displayed in a lower right corner of each application icon 421.

In this way, the user may intuitively learn, by using the primary icon displayed on the first screen and the corresponding application subscript, the subordinate icon paired with each primary icon and a display position of the subordinate icon on the other screen, so that the user can memorize a display position of each desktop icon on the screen, and further improve efficiency of searching for the application icon by the user.

Optionally, after step 304, the method further includes:
when it is detected that an attribute of the primary icon and an attribute of the subordinate icon associated with the primary icon are exchanged, exchanging a display position of the primary icon and a display position of the subordinate icon.

An attribute of the desktop icon is related to a use scenario of the mobile terminal, and may vary with the use scenario of the mobile terminal. When the attribute of the desktop icon is different, a screen on which the desktop icon is displayed is different. Therefore, in an implementation, whether an attribute of a target primary icon and an attribute of a subordinate icon of the target primary icon are exchanged may be detected, that is, whether the attribute of the target primary icon changes to the attribute of the subordinate icon, and whether the attribute of the subordinate icon of the target primary icon changes to the attribute of the primary icon.

If it is detected that a type of a target primary icon and a type of a subordinate icon of the target primary icon are exchanged, that is, the target primary icon changes to a subordinate icon, and the original subordinate icon changes to a corresponding primary icon, a display position of the target primary icon and a display position of the subordinate icon of the target primary icon may be exchanged, that is, the target primary icon may be displayed at a target position on the second screen, and the subordinate icon may be displayed at a display position that is on the first screen and at which the target primary icon is originally displayed.

It should be noted that the user may switch from the first screen to the second screen by flipping the mobile terminal, to perform an operation, and in this case, an attribute of an application icon displayed on the first screen and an attribute of an application icon displayed on the second screen may be exchanged, that is, an attribute of the application icon displayed on the second screen changes to an attribute of the primary icon, and an attribute of the application icon displayed on the first screen changes to an attribute of the subordinate icon.

Figure 4B:
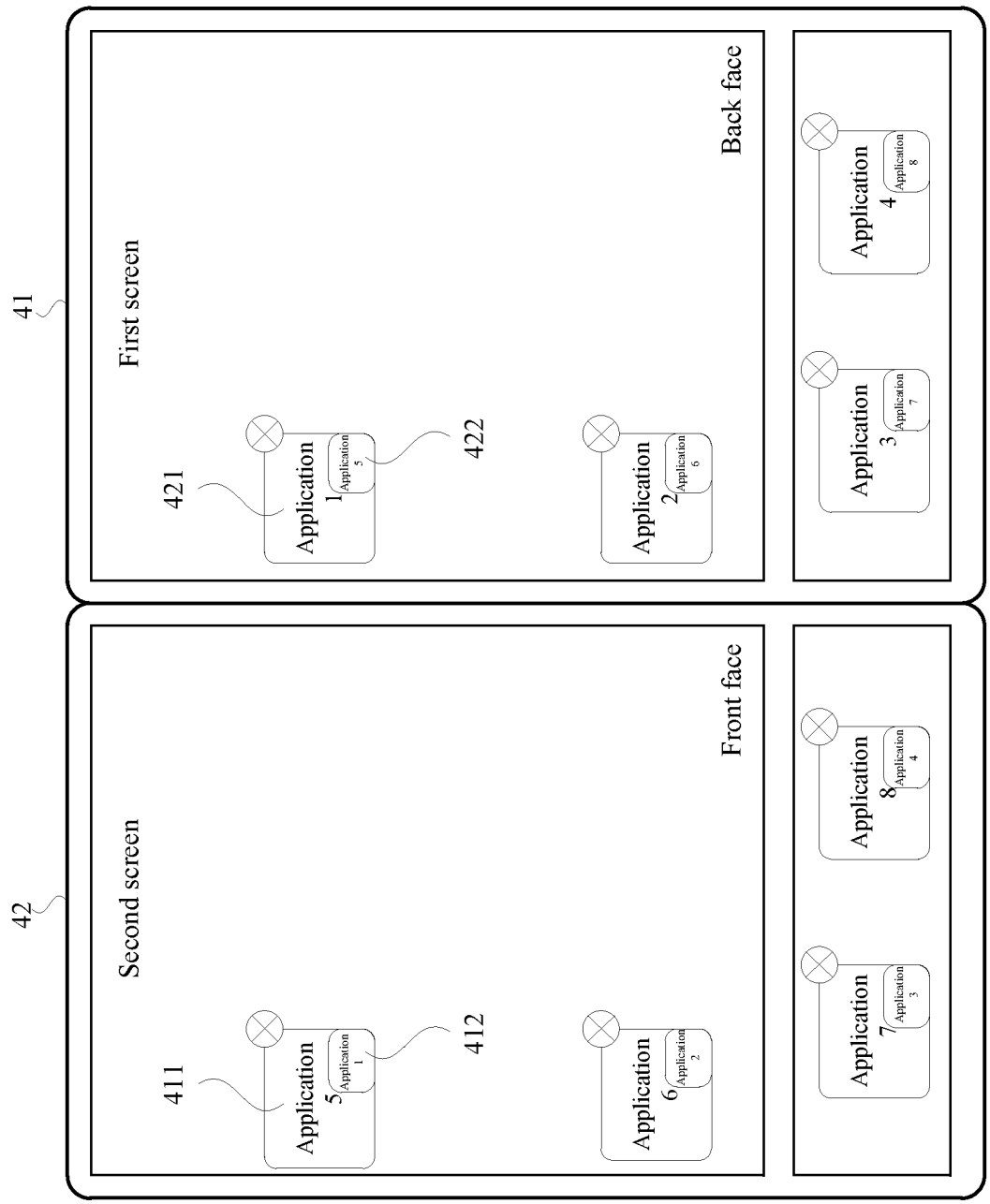
FIG. 4B is a schematic diagram of an interface in which a corresponding application icon and a corresponding application subscript are respectively displayed on a front screen and a back screen after a mobile terminal is flipped according to an embodiment of the present disclosure.

For example, as shown in FIG. 4A, the current front screen is the first screen 41, and the back screen is the second screen 42. When it is detected that the user flips the mobile terminal, as shown in FIG. 4B, the first screen 41 switches from the front screen to the back screen, the second screen 42 switches from the back screen to the front screen, the application icon originally displayed on the second screen changes from a subordinate icon attribute to a primary icon attribute, and the application icon originally displayed on the first screen changes from a primary icon attribute to a subordinate icon attribute.

In this way, when it is detected that the attribute of the primary icon and the attribute of the subordinate icon of the primary icon are exchanged, a display position of the primary icon and a display position of the subordinate icon may be exchanged, so that application icons corresponding to different attributes displayed on the first screen and the second screen are dynamically updated, and it is more convenient for the user to quickly find an application icon of a corresponding application program.

Optionally, after step 304, the method further includes:
when a screen flip operation for the mobile terminal is detected, turning on the second screen, turning off the first screen, and displaying the subordinate icon on the second screen.

In this implementation, when the user expects to flip to another screen to operate another desktop icon, the screen of the mobile terminal may be flipped. The mobile terminal may detect a screen flip operation on the mobile terminal, and may turn on the second screen. In this case, the second screen is a screen facing the user. Alternatively, the first screen may be turned off, to reduce power consumption. The determined subordinate icon may be displayed on the second screen for the user to operate.

For example, as shown in FIG. 4A, a main application icon 1 and a main application icon 2 are displayed on the first screen 41. When the user expects to operate an application icon 5 or an application icon 6, the screen may be flipped based on a prompt in an application subscript on the first screen 41, to switch to a screen interface shown in FIG. 4B. The second screen 42 is converted from backward the user to facing the user, and a subordinate application icon 5 and a subordinate application icon 6 may be displayed for the user to operate, and the first screen 41 may be turned off after being flipped, and the second screen 42 may be turned on after being flipped.

Optionally, an application subscript used to indicate a primary icon associated with the subordinate icon is displayed on the subordinate icon.

In this manner, similarly, after the subordinate icon is displayed on the second screen, an application subscript used to indicate a primary icon associated with the subordinate icon may also be displayed on the subordinate icon, to prompt the user of icon information stored at a relative position of the icon position on the back screen. For example, as shown in FIG. 4B, application subscripts of main application icons respectively associated with the subordinate application icon 5 and the subordinate application icon 6 are displayed on the subordinate application icon 5 and the subordinate application icon 6 displayed on the second screen 42.

Optionally, after step 303, the method further includes:
limiting a target permission of an application program corresponding to the subordinate icon; where the target permission includes at least one of a running permission, an access permission, or a payment permission.

In this implementation, for a determined subordinate icon in the desktop icons, a target permission of an application program corresponding to the subordinate icon may be limited, to prevent the user from causing a hidden danger such as user privacy and property security caused when the user operates an irrelevant application program by accident in the current use scenario. The target permission may include one or more of a running permission, an access permission, a payment permission, and the like.

For example, when the mobile terminal is in an outdoor scenario, a payment application program is unrelated to the outdoor scenario. In this case, a payment permission of the payment application program may be limited. When the user triggers a payment function of the payment application program by accident, payment cannot be completed due to a payment permission limitation, thereby achieving an objective of preventing a property loss of the user.

Certainly, this implementation may also be applied to the embodiment shown in FIG. 1, and a same beneficial effect can be achieved.

In this embodiment, the subordinate icon associated with the primary icon is determined, the primary icon is displayed on the first screen, and the display position of the subordinate icon of the primary icon is determined as the target position on the second screen, so that both screen display space is saved and the user can quickly find a position of the application icon.

In addition, based on the embodiment shown in FIG. 1, multiple optional implementations are further added in this embodiment. These optional implementations may be implemented in combination with each other or may be implemented separately, so that the user can quickly find an application icon of a desired application program, thereby achieving a technical effect of improving icon searching efficiency.

Figure 5:
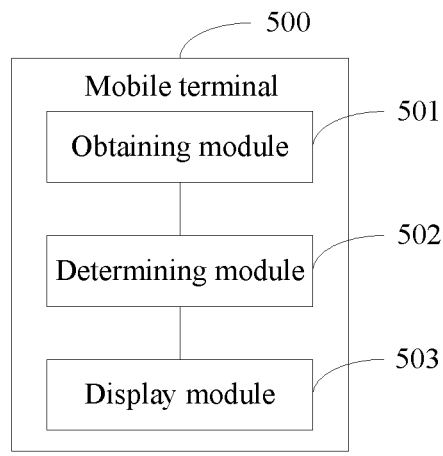
FIG. 5 is a schematic structural diagram of a mobile terminal according to an embodiment of the present disclosure.

FIG. 5 is a schematic structural diagram of a mobile terminal according to an embodiment of the present disclosure. The mobile terminal includes two screens, and the two screens are respectively located on two surfaces of the mobile terminal that are disposed opposite to each other. As shown in FIG. 5, a mobile terminal 500 includes:
an obtaining module 501, configured to obtain a current use scenario of the mobile terminal 500;
a determining module 502, configured to determine a primary icon and a subordinate icon in desktop icons of the mobile terminal 500 based on the current use scenario of the mobile terminal 500, where the primary icon is related to the current use scenario of the mobile terminal 500; and
a display module 503, configured to display the primary icon on a first screen, where the first screen is a screen that currently faces a user in the two screens, the subordinate icon is used to be displayed on a second screen, and the second screen is a screen that is currently backwards the user in the two screens.

Figure 6:
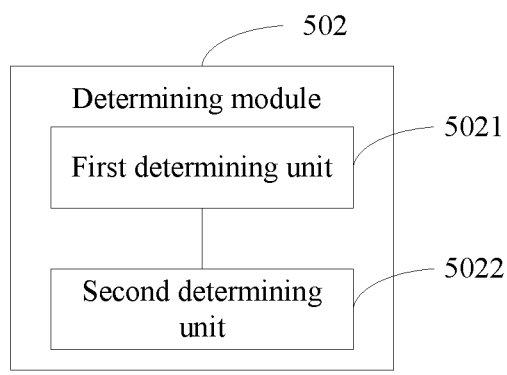
FIG. 6 is a schematic structural diagram of a determining module of a mobile terminal according to an embodiment of the present disclosure.

Optionally, as shown in FIG. 6, the determining module 502 includes:
a first determining unit 5021, configured to determine the primary icon in the desktop icons of the mobile terminal 500 based on the current use scenario of the mobile terminal 500; and a second determining unit 5022, configured to determine a subordinate icon associated with the primary icon; where the subordinate icon associated with the primary icon is used to be displayed at a target position on the second screen, and the target position is opposite to a display position of the primary icon on the first screen.

Optionally, the second determining unit 5022 is configured to determine, based on a preset icon association relationship, the subordinate icon associated with the primary icon; or the second determining unit 5022 is configured to determine an icon in the desktop icons of the mobile terminal 500 that has a minimum conflict value with the primary icon as the subordinate icon associated with the primary icon, where a minimum conflict value indicates a shortest duration that two icons are simultaneously primary icons or subordinate icons in the current use scenario of the mobile terminal 500.

Optionally, the display module 503 is configured to display the primary icon on the first screen, and display, on the primary icon, an application subscript used to indicate the subordinate icon associated with the primary icon.

Figure 7:
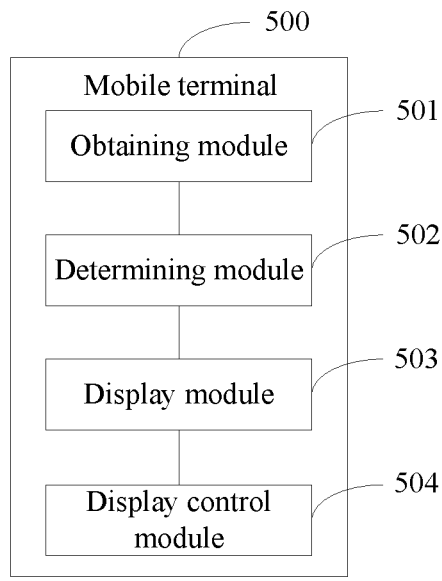
FIG. 7 is another schematic structural diagram of a mobile terminal according to an embodiment of the present disclosure.

Optionally, as shown in FIG. 7, the mobile terminal further includes:

a display control module 504, configured to: when a screen flip operation for the mobile terminal 500 is detected, turn on the second screen, turn off the first screen, and display the subordinate icon on the second screen.

Figure 8:
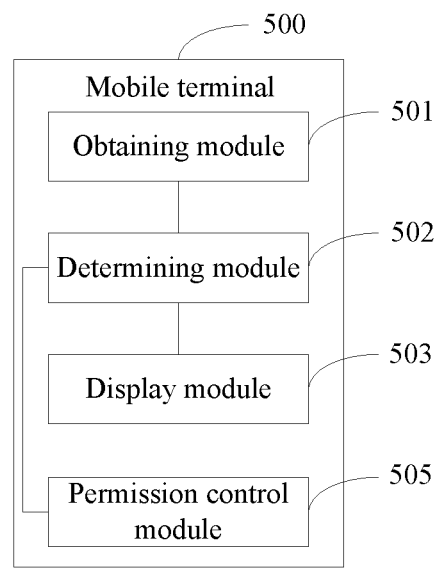
FIG. 8 is another schematic structural diagram of a mobile terminal according to an embodiment of the present disclosure.

Optionally, as shown in FIG. 8, the mobile terminal 500 further includes:

a permission control module 505, configured to limit a target permission of an application program corresponding to the subordinate icon; where the target permission includes at least one of a running permission, an access permission, or a payment permission.

The use scenario includes at least one of a current time period or a current position scenario.

The mobile terminal 500 can implement processes implemented by the mobile terminal in the foregoing method embodiments of FIG. 1 and FIG. 4. To avoid repetition, details are not described herein again. In the mobile terminal 500 in this embodiment of the present disclosure, an application icon of an application program related to a current use scenario may be displayed on a screen of a mobile terminal, to save screen display space of the mobile terminal. In this way, a relatively small quantity of application icons are displayed on the screen of the mobile terminal 500, and the displayed application icon is relatively related to the current use scenario, so that a user can quickly find an application icon of a desired application program, thereby improving icon searching efficiency.

Figure 9:
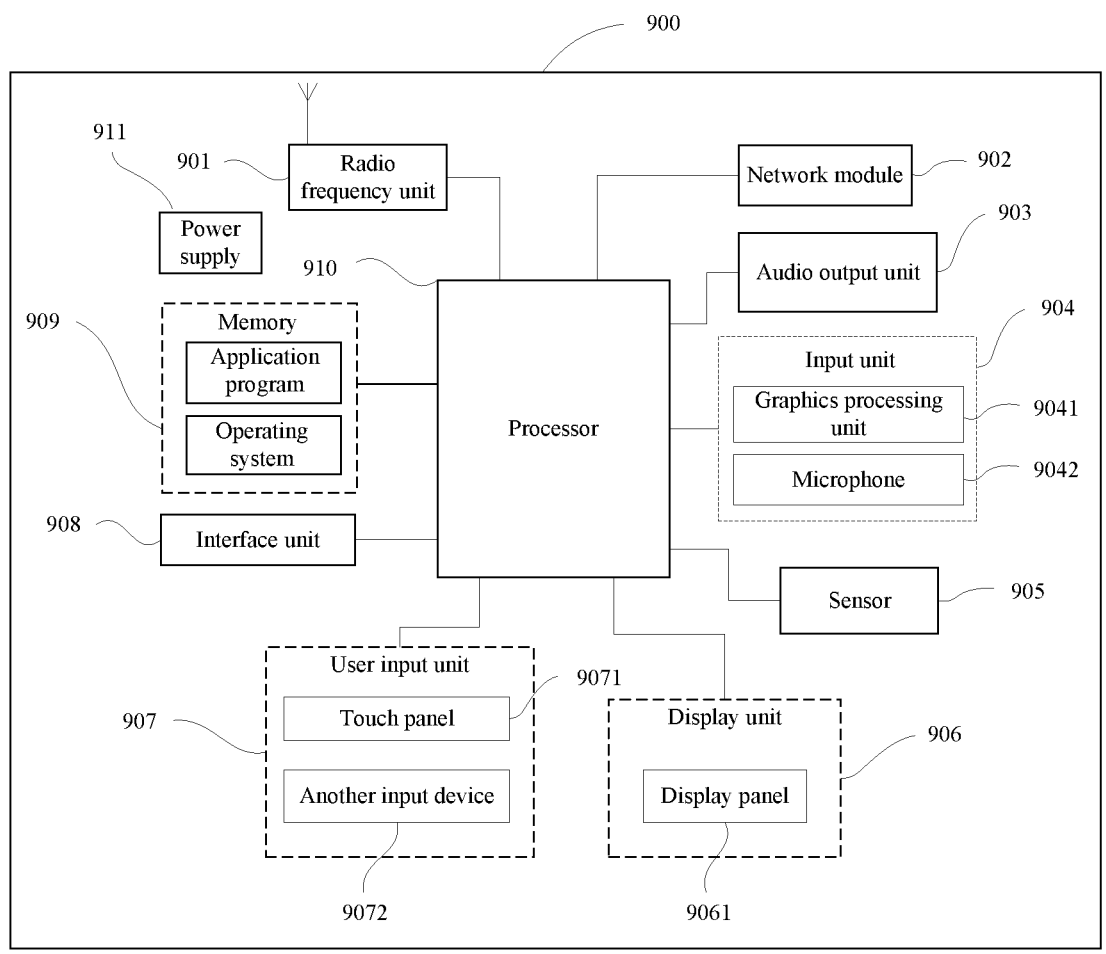
FIG. 9 is a schematic diagram of a hardware structure of a mobile terminal according to an embodiment of the present disclosure.

FIG. 9 is a schematic diagram of a hardware structure of a mobile terminal according to embodiments of the present disclosure. The mobile terminal 900 includes a first screen, and the mobile terminal 900 further includes but is not limited to components such as a radio frequency unit 901, a network module 902, an audio output unit 903, an input unit 904, a sensor 905, a display unit 906, a user input unit 907, an interface unit 908, a memory 909, a processor 910, and a power supply 911. A person skilled in the art may understand that a structure of the mobile terminal shown in FIG. 9 does not constitute a limitation on the mobile terminal, and the mobile terminal may include more or fewer components than those shown in the figure, or combine some components, or have different component arrangements. In this embodiment of the present disclosure, the mobile terminal includes but is not limited to a mobile phone, a tablet computer, a laptop computer, a palmtop computer, an in-vehicle terminal, a wearable device, a pedometer, and the like.

The processor 910 is configured to: obtain a current use scenario of the mobile terminal 900;

determine a primary icon and a subordinate icon in desktop icons of the mobile terminal 900 based on the current use scenario of the mobile terminal 900, where the primary icon is related to the current use scenario of the mobile terminal 900; and display the primary icon on a first screen, where the first screen is a screen that currently faces a user in the two screens, the subordinate icon is used to be displayed on a second screen, and the second screen is a screen that is currently backwards the user in the two screens.

Optionally, the processor 910 is further configured to:

determine the primary icon in the desktop icons of the mobile terminal 900 based on the current use scenario of the mobile terminal 900; and determining a subordinate icon associated with the primary icon; where the subordinate icon associated with the primary icon is used to be displayed at a target position on the second screen, and the target position is opposite to a display position of the primary icon on the first screen.

Optionally, the processor 910 is further configured to:

determine, based on a preset icon association relationship, the subordinate icon associated with the primary icon; or determine an icon in the desktop icons of the mobile terminal 900 that has a minimum conflict value with the primary icon as the subordinate icon associated with the primary icon, where the minimum conflict value represents minimum duration of a case in which both two icons are primary icons or subordinate icons in the current use scenario of the mobile terminal.

Optionally, the processor 910 is further configured to:

display the primary icon on the first screen, and displaying, on the primary icon, an application subscript used to indicate the subordinate icon associated with the primary icon.

Optionally, the processor 910 is further configured to:

when a screen flip operation for the mobile terminal 900 is detected, turn on the second screen, turn off the first screen, and display the subordinate icon on the second screen.

Optionally, the processor 910 is further configured to:

limit a target permission of an application program corresponding to the subordinate icon, where the target permission includes at least one of a running permission, an access permission, or a payment permission.

The mobile terminal 900 can implement processes implemented by the mobile terminal in the foregoing method embodiments. To avoid repetition, details are not described herein again. In the mobile terminal 900 in this embodiment of the present disclosure, an application icon of an application program related to a current use scenario may be displayed on a screen of a mobile terminal, to save screen display space of the mobile terminal. In this way, a relatively small quantity of application icons are displayed on the screen of the mobile terminal 900, and the displayed application icon is relatively related to the current use scenario, so that a user can quickly find an application icon of a desired application program, thereby improving icon searching efficiency.

It should be understood that, in this embodiment of the present disclosure, the radio frequency unit 901 may be configured to receive and send information or receive and send a signal in a call process. For example, after downlink data from a base station is received, the processor 910 processes the downlink data. In addition, uplink data is sent to the base station. Generally, the radio frequency unit 901 includes but is not limited to an antenna, at least one amplifier, a transceiver, a coupler, a low noise amplifier, a duplexer, and the like. In addition, the radio frequency unit 901 may further communicate with a network and another device by using a wireless communication system.

The mobile terminal provides wireless broadband Internet access for a user by using a network module 902, for example, helping the user send and receive an email, browsing a web page, and accessing streaming media.

The audio output unit 903 may convert audio data received by the radio frequency unit 901 or the network module 902 or stored in the memory 909 into an audio signal and output as sound. In addition, the audio output unit 903 may further provide audio output (for example, call signal receiving sound or message receiving sound) related to a specific function performed by the mobile terminal 900. The audio output unit 903 includes a loudspeaker, a buzzer, a telephone receiver, and the like.

The input unit 904 is configured to receive an audio or video signal. The input unit 904 may include a graphics processing unit (GPU) 9041 and a microphone 9042. The graphics processing unit 9041 processes image data of a static picture or a video obtained by an image capture apparatus (such as a camera) in a video capture mode or an image capture mode. A processed image frame may be displayed on the display unit 906. The image frame processed by the graphics processing unit 9041 may be stored in the memory 909 (or another storage medium) or sent by using the radio frequency unit 901 or the network module 902. The microphone 9042 may receive sound and can process such sound into audio data. The processed audio data may be output by being converted into a format that may be sent to a mobile communication base station by using the radio frequency unit 901 in a telephone call mode.

The mobile terminal 900 further includes at least one sensor 905, such as an optical sensor, a motion sensor, and another sensor. For example, the optical sensor includes an ambient light sensor and a proximity sensor. The ambient light sensor may adjust luminance of the display panel 9061 based on brightness of ambient light, and the proximity sensor may disable the display panel 9061 and/or backlight when the mobile terminal 900 approaches an ear. As a type of the motion sensor, an accelerometer sensor may detect magnitude of an acceleration in each direction (generally three axes), and may detect magnitude and a direction of gravity when being static. The accelerometer sensor may be used for recognizing a mobile terminal gesture (for example, horizontal and vertical screen switching, a game, or magnetometer posture calibration), a function to vibration recognition (for example, a pedometer or a strike), or the like. The sensor 905 may further include a fingerprint sensor, a pressure sensor, an iris sensor, a molecular sensor, a gyroscope, a barometer, a hygrometer, a thermometer, an infrared sensor, and the like. This is not described herein.

The display unit 906 is configured to display information entered by the user or information provided for the user. The display unit 906 may include a display panel 9061, and the display panel 9061 may be configured in a form of a liquid crystal display (LCD), an organic light-emitting diode (OLED), or the like.

The user input unit 907 may be configured to receive input digit or character information and generate key signal input to user setting and function control of the mobile terminal. For example, the user input unit 907 includes a touch panel 9071 and another input device 9072. The touch panel 9071, also referred to as a touchscreen, may collect a touch operation performed by the user on or near the touch panel 9071 (for example, an operation performed by the user on or near the touch panel 9071 by using any suitable object or accessory such as a finger or a stylus). The touch panel 9071 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, sends the contact coordinates to the processor 910, and can receive and execute a command sent by the processor 910. In addition, the touch panel 9071 may be implemented by using a plurality of types such as a resistive type, a capacitive type, an infrared ray, and a surface acoustic wave. The user input unit 907 may include another input device 9072 in addition to the touch panel 9071. The another input device 9072 may include but is not limited to one or more of a physical keyboard, a function key (such as a volume control key or an on/off key), a trackball, a mouse, a joystick, and the like. Details are not described herein.

Optionally, the touch panel 9071 may cover the display panel 9061. After detecting the touch operation on or near the touch panel 9071, the touch panel 9061 transmits the touch operation to the processor 910 to determine a type of a touch event, and then the processor 910 provides corresponding visual output on the display panel 9061 based on the type of the touch event. In FIG. 9, the touch panel 9071 and the display panel 9061 are used as two independent components to implement input and output functions of the mobile terminal. However, in some embodiments, the touch panel 9071 and the display panel 9061 may be integrated to implement the input and output functions of the mobile terminal. This is not specifically limited herein.

The interface unit 908 is an interface connecting an external apparatus to the mobile terminal 900. For example, the external apparatus may include a wired or wireless headset port, an external power supply (or battery charger) port, a wired or wireless data port, a storage card port, a port configured to connect to an apparatus having an identification module, an audio input/output (I/O) port, a video I/O port, a headset port, and the like. The interface unit 908 may be configured to receive input (for example, data information and power) from the external apparatus and transmit the received input to one or more elements in the mobile terminal 900, or may be configured to transmit data between the mobile terminal 900 and the external apparatus.

The memory 909 may be configured to store a software program and various data. The memory 909 may mainly include a program storage area and a data storage area. The program storage area may store an operating system, an application program required by at least one function (such as a sound play function or an image play function), and the like. The data storage area may store data (such as audio data or an address book) or the like created based on use of the mobile phone. In addition, the memory 909 may include a high-speed random access memory, and may further include a non-volatile memory such as at least one magnetic disk storage component, a flash memory component, or another volatile solid-state storage component.

The processor 910 is a control center of the mobile terminal, and is connected to all parts of the entire mobile terminal by using various interfaces and lines, and performs various functions of the mobile terminal and processes data by running or executing the software program and/or the module that are stored in the memory 909 and invoking the data stored in the memory 909, to implement overall monitoring on the mobile terminal. The processor 910 may include one or more processing units. Optionally, the processor 910 may be integrated with an application processor and a modem processor. The application processor mainly processes an operating system, a user interface, an application program, and the like, and the modem processor mainly processes wireless communication. It may be understood that the modem processor may alternatively not be integrated into the processor 910.

The mobile terminal 900 may further include a power supply 911 (such as a battery) that supplies power to each component. Optionally, the power supply 911 may be logically connected to the processor 910 by using a power management system, to implement functions such as charging, discharging, and power consumption management by using the power management system.

In addition, the mobile terminal 900 includes some function modules not shown, and details are not described herein.

Optionally, an embodiment of the present disclosure further provides a mobile terminal, including a processor 910, a memory 909, and a computer program that is stored in the memory 909 and executable on the processor 910. When the computer program is executed by the processor 910, each process of the foregoing icon display method embodiments can be implemented, and a same technical effect can be achieved. To avoid repetition, details are not described herein.

An embodiment of the present disclosure further provides a non-transitory computer-readable storage medium. A computer program is stored in the non-transitory computer-readable storage medium. When being executed by a processor, processes of the foregoing icon display method embodiments can be implemented, and a same technical effect can be achieved. To avoid repetition, details are not described herein. The non-transitory computer-readable storage medium includes a read-only memory (ROM), a random access memory (RAM), a magnetic disk, an optical disc, or the like.

It should be noted that in this specification, the term "include", "including", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. In the absence of more restrictions, an element defined by the statement "including a . . . " does not exclude another same element in a process, method, article, or apparatus that includes the element.

According to the descriptions of the foregoing implementations, a person skilled in the art may clearly understand that the foregoing method embodiments may be implemented by using software and a required universal hardware platform, or certainly may be implemented by using hardware. However, in many cases, the former is a better implementation. Based on such an understanding, the technical solutions of the present disclosure essentially or the part contributing to technologies may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to execute the methods described in the embodiments of the present disclosure.

The embodiments of the present disclosure are described with reference to the accompanying drawings above. However, the present disclosure is not limited to the foregoing specific implementations. The foregoing specific implementations are merely exemplary, but are not limiting. A person of ordinary skill in the art may make many forms under the inspiration of the present invention without departing from the objective and the scope of the claims of the present disclosure.

What is claimed is:

1. An icon display method, performed by a mobile terminal, wherein the mobile terminal comprises two screens, the two screens are respectively located on two surfaces of the mobile terminal that are disposed opposite to each other, and the method comprises:

obtaining a current use scenario of the mobile terminal;

determining a primary icon and a subordinate icon in desktop icons of the mobile terminal based on the current use scenario of the mobile terminal, wherein the primary icon is related to the current use scenario of the mobile terminal; and displaying the primary icon on a first screen, wherein the first screen is a screen that currently faces a user in the two screens, the subordinate icon is used to be displayed on a second screen, and the second screen is a screen that is currently backwards the user in the two screens; wherein the determining a primary icon and a subordinate icon in desktop icons of the mobile terminal based on the current use scenario of the mobile terminal comprises:

determining the primary icon in the desktop icons of the mobile terminal based on the current use scenario of the mobile terminal; and determining a subordinate icon associated with the primary icon; wherein the determining a subordinate icon associated with the primary icon comprises:

determining an icon in the desktop icons of the mobile terminal that has a minimum conflict value with the primary icon as the subordinate icon associated with the primary icon, wherein a minimum conflict value indicates a shortest duration that two icons are simultaneously primary icons or subordinate icons in the current use scenario of the mobile terminal; wherein the determining an icon in the desktop icons of the mobile terminal that has a minimum conflict value with the primary icon as the subordinate icon associated with the primary icon comprises:

determining to-be-paired desktop icons that are in the desktop icons of the mobile terminal and that are unrelated to the current use scenario of the mobile terminal, and separately calculating a conflict value between each desktop icon in the to-be-paired desktop icons and a target primary icon, and determining an icon in the to-be-paired desktop icons that has a minimum conflict value with the target primary icon as a subordinate icon associated with the target primary icon; wherein the separately calculating a conflict value between each desktop icon in the to-be-paired desktop icons and a target primary icon comprises:
  separately calculating duration in which each desktop icon in the to-be-paired desktop icons and the target primary icon are simultaneously primary icons or subordinate icons in the current use scenario of the mobile terminal;
  the subordinate icon associated with the primary icon is used to be displayed at a target position on the second screen, and the target position is opposite to a display position of the primary icon on the first screen; wherein the display position of the primary icon on the first screen and the target position on the second screen are mirrored display positions, and the primary icon is one to one associated with the subordinate icon;
  wherein the displaying the primary icon on a first screen comprises:
  displaying the primary icon on the first screen, and displaying, on the primary icon, an application subscript used to indicate the subordinate icon associated with the primary icon.

2. The method according to claim 1, wherein the determining a subordinate icon associated with the primary icon further comprises:
  determining, based on a preset icon association relationship, the subordinate icon associated with the primary icon.

3. The method according to claim 1, wherein after the displaying the primary icon on a first screen, the method further comprises:
  when a screen flip operation for the mobile terminal is detected, turning on the second screen, turning off the first screen, and displaying the subordinate icon on the second screen.

4. The method according to claim 1, wherein after the determining a primary icon and a subordinate icon in desktop icons of the mobile terminal, the method further comprises:
  limiting a target permission of an application program corresponding to the subordinate icon, wherein the target permission comprises at least one of a running permission, an access permission, or a payment permission.

5. The method according to claim 1, wherein the use scenario comprises at least one of a current time period or a current position scenario.

6. A mobile terminal, comprising: a memory, a processor, and a computer program that is stored in the memory and executable on the processor, wherein the computer program, when executed by the processor, causes the mobile terminal to perform:
  obtaining a current use scenario of the mobile terminal;
  determining a primary icon and a subordinate icon in desktop icons of the mobile terminal based on the current use scenario of the mobile terminal, wherein the primary icon is related to the current use scenario of the mobile terminal; and
  displaying the primary icon on a first screen, wherein the first screen is a screen that currently faces a user in two screens of the mobile terminal, the subordinate icon is used to be displayed on a second screen, and the second screen is a screen that is currently backwards the user in the two screens; wherein
  the computer program, when executed by the processor, causes the mobile terminal to perform:
  determining the primary icon in the desktop icons of the mobile terminal based on the current use scenario of the mobile terminal; and
  determining a subordinate icon associated with the primary icon; wherein the computer program, when executed by the processor, causes the mobile terminal to perform:
  determining an icon in the desktop icons of the mobile terminal that has a minimum conflict value with the primary icon as the subordinate icon associated with the primary icon, wherein a minimum conflict value indicates a shortest duration that two icons are simultaneously primary icons or subordinate icons in the current use scenario of the mobile terminal; wherein
  the computer program, when executed by the processor, causes the mobile terminal to perform:
  determining to-be-paired desktop icons that are in the desktop icons of the mobile terminal and that are unrelated to the current use scenario of the mobile terminal, and separately calculating a conflict value between each desktop icon in the to-be-paired desktop icons and a target primary icon, and determining an icon in the to-be-paired desktop icons that has a minimum conflict value with the target primary icon as a subordinate icon associated with the target primary icon; wherein
  the computer program, when executed by the processor, causes the mobile terminal to perform:
  separately calculating duration in which each desktop icon in the to-be-paired desktop icons and the target primary icon are simultaneously primary icons or subordinate icons in the current use scenario of the mobile terminal;
  the subordinate icon associated with the primary icon is used to be displayed at a target position on the second screen, and the target position is opposite to a display position of the primary icon on the first screen; wherein the display position of the primary icon on the first screen and the target position on the second screen are mirrored display positions, and the primary icon is one to one associated with the subordinate icon;
  wherein the computer program, when executed by the processor, causes the mobile terminal to perform:
  displaying the primary icon on the first screen, and displaying, on the primary icon, an application subscript used to indicate the subordinate icon associated with the primary icon.

7. The mobile terminal according to claim 6, wherein the computer program, when executed by the processor, causes the mobile terminal to further perform:
  determining, based on a preset icon association relationship, the subordinate icon associated with the primary icon.

8. The mobile terminal according to claim 6, wherein the computer program, when executed by the processor, causes the mobile terminal to further perform:
  when a screen flip operation for the mobile terminal is detected, turning on the second screen, turning off the first screen, and displaying the subordinate icon on the second screen.

9. The mobile terminal according to claim 6, wherein the computer program, when executed by the processor, causes the mobile terminal to further perform:
  limiting a target permission of an application program corresponding to the subordinate icon, wherein the target permission comprises at least one of a running permission, an access permission, or a payment permission.

10. The mobile terminal according to claim 6, wherein the use scenario comprises at least one of a current time period or a current position scenario.

11. A non-transitory computer-readable storage medium, wherein the non-transitory computer-readable storage medium stores a computer program that is executable on a processor, and the computer program, when executed by a processor of a mobile terminal, causes the mobile terminal to perform:
   obtaining a current use scenario of the mobile terminal;
   determining a primary icon and a subordinate icon in desktop icons of the mobile terminal based on the current use scenario of the mobile terminal, wherein the primary icon is related to the current use scenario of the mobile terminal; and
   displaying the primary icon on a first screen, wherein the first screen is a screen that currently faces a user in two screens of the mobile terminal, the subordinate icon is used to be displayed on a second screen, and the second screen is a screen that is currently backwards the user in the two screens; wherein
   the computer program, when executed by the processor, causes the mobile terminal to perform:
   determining the primary icon in the desktop icons of the mobile terminal based on the current use scenario of the mobile terminal; and
   determining a subordinate icon associated with the primary icon; wherein the computer program, when executed by the processor, causes the mobile terminal to perform:
   determining an icon in the desktop icons of the mobile terminal that has a minimum conflict value with the primary icon as the subordinate icon associated with the primary icon, wherein a minimum conflict value indicates a shortest duration that two icons are simultaneously primary icons or subordinate icons in the current use scenario of the mobile terminal; wherein
   the computer program, when executed by the processor, causes the mobile terminal to perform:
   determining to-be-paired desktop icons that are in the desktop icons of the mobile terminal and that are unrelated to the current use scenario of the mobile terminal, and separately calculating a conflict value between each desktop icon in the to-be-paired desktop icons and a target primary icon, and determining an icon in the to-be-paired desktop icons that has a minimum conflict value with the target primary icon as a subordinate icon associated with the target primary icon; wherein the computer program, when executed by the processor, causes the mobile terminal to perform:
   separately calculating duration in which each desktop icon in the to-be-paired desktop icons and the target primary icon are simultaneously primary icons or subordinate icons in the current use scenario of the mobile terminal;
   the subordinate icon associated with the primary icon is used to be displayed at a target position on the second screen, and the target position is opposite to a display position of the primary icon on the first screen; wherein the display position of the primary icon on the first screen and the target position on the second screen are mirrored display positions, and the primary icon is one to one associated with the subordinate icon;
   wherein the computer program, when executed by the processor, causes the mobile terminal to perform:
   displaying the primary icon on the first screen, and displaying, on the primary icon, an application subscript used to indicate the subordinate icon associated with the primary icon.

12. The non-transitory computer-readable storage medium according to claim 11, wherein the computer program, when executed by the processor, causes the mobile terminal to further perform:
   determining, based on a preset icon association relationship, the subordinate icon associated with the primary icon.

13. The non-transitory computer-readable storage medium according to claim 11, wherein the computer program, when executed by the processor, causes the mobile terminal to further perform:
   when a screen flip operation for the mobile terminal is detected, turning on the second screen, turning off the first screen, and displaying the subordinate icon on the second screen.

14. The non-transitory computer-readable storage medium according to claim 11, wherein the computer program, when executed by the processor, causes the mobile terminal to further perform:
   limiting a target permission of an application program corresponding to the subordinate icon, wherein the target permission comprises at least one of a running permission, an access permission, or a payment permission.

15. The non-transitory computer-readable storage medium according to claim 11, wherein the use scenario comprises at least one of a current time period or a current position scenario.

* * * * *